United States Patent
Chang et al.

(10) Patent No.: US 10,623,034 B2
(45) Date of Patent: Apr. 14, 2020

(54) RECEIVER CIRCUIT FOR DETERMINING WHETHER TO DISCARD I/Q MISMATCH COMPENSATION PARAMETERS ACCORDING TO SIGNAL-TO-INTERFERENCE RATIO

(71) Applicant: Realtek Semiconductor Corp., Hsinchu (TW)

(72) Inventors: Yuan-Shuo Chang, Hsinchu (TW); Tzu-Ming Kao, Hualien County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/536,045

(22) Filed: Aug. 8, 2019

(65) Prior Publication Data

US 2020/0059257 A1 Feb. 20, 2020

(30) Foreign Application Priority Data

Aug. 17, 2018 (TW) .............................. 107128898 A

(51) Int. Cl.
*H04B 1/10* (2006.01)

(52) U.S. Cl.
CPC .................................. *H04B 1/1027* (2013.01)

(58) Field of Classification Search
CPC ........ H04B 1/10; H04B 1/1027; H04B 10/07; H04B 17/00; H04B 17/10; H04B 17/11; H04B 17/14; H04B 17/15; H04B 17/16; H04B 17/19
USPC .......................... 375/224, 227, 228, 316, 346
See application file for complete search history.

(56) References Cited

U.S. PATENT DOCUMENTS

| | | | | |
|---|---|---|---|---|
| 7,567,611 B2 * | 7/2009 | Chien | ...................... | H04B 1/30 375/219 |
| 8,831,550 B2 * | 9/2014 | Chang | ...................... | H04B 1/10 375/296 |
| 9,413,294 B2 * | 8/2016 | Suissa | ................. | H04L 27/0014 |
| 2005/0047536 A1 * | 3/2005 | Wu | ...................... | H04L 27/3863 375/346 |
| 2010/0329397 A1 | 12/2010 | Kim | | |
| 2015/0171978 A1 | 6/2015 | Mehrmanesh et al. | | |
| 2017/0346509 A1 * | 11/2017 | Sulimarski | ............. | H04B 17/11 |

OTHER PUBLICATIONS

Taiwanese Office Communication for TW 107128898, search completion date May 30, 2019 (with partial English translation).

* cited by examiner

*Primary Examiner* — Siu M Lee
(74) *Attorney, Agent, or Firm* — Birch, Stewart, Kolasch & Birch, LLP

(57) ABSTRACT

A receiver circuit of a transceiver is disclosed including: a calibration circuit arranged to operably perform an I/Q mismatch calibration operation according to an in-phase detection signal and a quadrature detection signal to generate one or more compensation parameters; a parameter storage circuit; an interference detection circuit arranged to operably generate an estimated signal-to-interference ratio according to the in-phase detection signal and the quadrature detection signal; a receiver control circuit arranged to operably determine whether to discard the one or more compensation parameters, wherein the receiver control circuit stores the one or more compensation parameters into the parameter storage circuit only if the estimated signal-to-interference ratio exceeds a predetermined threshold.

8 Claims, 3 Drawing Sheets

US 10,623,034 B2

RECEIVER CIRCUIT FOR DETERMINING WHETHER TO DISCARD I/Q MISMATCH COMPENSATION PARAMETERS ACCORDING TO SIGNAL-TO-INTERFERENCE RATIO

CROSS-REFERENCE TO RELATED APPLICATIONS

This application claims the benefit of priority to patent application Ser. No. 10/712,898, filed in Taiwan on Aug. 17, 2018; the entirety of which is incorporated herein by reference for all purposes.

BACKGROUND

The disclosure generally relates to a transceiver and, more particularly, to a receiver circuit capable of determining whether to discard in-phase/quadrature mismatch compensation parameters according to a signal-to-interference ratio.

In the receiver circuit of many wireless communication devices, the in-phase signal (a.k.a. I signal) and the quadrature signal (a.k.a. Q signal) typically have so-called I/Q mismatch phenomenon, which means that there is a gain mismatch and/or a phase mismatch between the in-phase signal and the quadrature signal.

The I/Q mismatch phenomenon often results in mirror frequency interference which would reduce the signal-to-noise ratio (SNR) of the receiver circuit, thereby degrading the throughput of the overall system.

SUMMARY

An example embodiment of a receiver circuit of a transceiver is disclosed, comprising: a calibration circuit, arranged to operably perform an I/Q mismatch calibration operation according to an in-phase detection signal and a quadrature detection signal to generate one or more compensation parameters; a parameter storage circuit; an interference detection circuit, arranged to operably generate an estimated signal-to-interference ratio according to the in-phase detection signal and the quadrature detection signal; and a receiver control circuit, coupled with the calibration circuit, the parameter storage circuit, and the interference detection circuit, and arranged to operably determine whether to discard the one or more compensation parameters according to the estimated signal-to-interference ratio; wherein the receiver control circuit stores the one or more compensation parameters into the parameter storage circuit only if the estimated signal-to-interference ratio exceeds a predetermined threshold.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
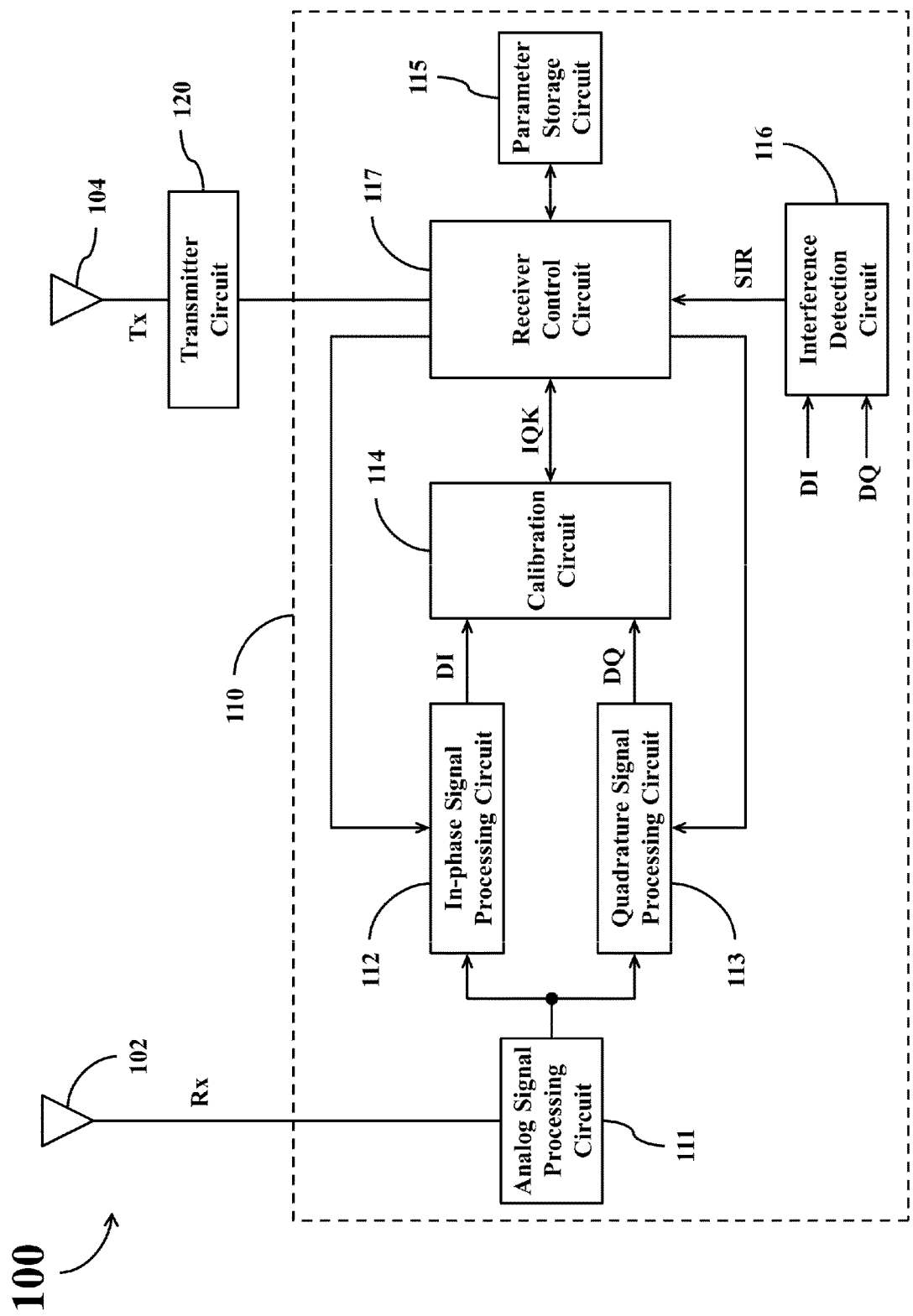
FIG. 1 shows a simplified functional block diagram of a transceiver according to one embodiment of the present disclosure.

FIG. 1 shows a simplified functional block diagram of a transceiver 100 according to one embodiment of the present disclosure. The transceiver 100 comprises a receiver circuit 110 and a transmitter circuit 120. During normal operation, the receiver circuit 110 may process a received signal Rx transmitted from a receiving antenna 102, and the transmitter circuit 120 may generate a transmission signal Tx to be transmitted through a transmitting antenna 104.

Before conducting normal operation, the receiver circuit 110 performs an I/Q mismatch calibration procedure to eliminate or reduce the I/Q mismatch phenomenon in the receiver circuit 110.

As shown in FIG. 1, the receiver circuit 110 of this embodiment comprises an analog signal processing circuit 111, an in-phase signal processing circuit 112, a quadrature signal processing circuit 113, a calibration circuit 114, a parameter storage circuit 115, an interference detection circuit 116, and a receiver control circuit 117.

The analog signal processing circuit 111 is arranged to operably process signals received by the receiving antenna 102. The in-phase signal processing circuit 112 is coupled with the analog signal processing circuit 111, and arranged to operably generate an in-phase detection signal DI according to signals outputted from the analog signal processing circuit 111. The quadrature signal processing circuit 113 is coupled with the analog signal processing circuit 111, and arranged to operably generate a quadrature detection signal DQ according to the signals outputted from the analog signal processing circuit 111.

The calibration circuit 114 is coupled with the in-phase signal processing circuit 112 and the quadrature signal processing circuit 113, and arranged to operably perform an I/Q mismatch calibration operation according to the in-phase detection signal DI and the quadrature detection signal DQ, so as to generate one or more compensation parameters IQK.

For example, the calibration circuit 114 may calculate a power of image frequency components caused by I/Q mismatch according to the in-phase detection signal DI and the quadrature detection signal DQ, and conduct various appropriate calibration algorithms to adjust relevant compensating coefficients employed in the calibration circuit 114 and/or gain setting values of related amplifiers (not shown in the drawings) of the analog signal processing circuit 111, so as to minimize the power of the aforementioned image frequency components. When the calibration circuit 114 reduces the power of the aforementioned image frequency components to a minimum level, the I/Q mismatch calibration operation of the current stage is completed. In this situation, the calibration circuit 114 may output the obtained compensating coefficients and/or the gain setting values of the related amplifiers in an appropriate data format to be the aforementioned one or more compensation parameters IQK.

The interference detection circuit 116 is coupled with the in-phase signal processing circuit 112 and the quadrature signal processing circuit 113, and arranged to operably perform an interference detection operation according to the in-phase detection signal DI and the quadrature detection signal DQ, so as to generate an estimated signal-to-interference ratio SIR corresponding to the interference level of the current environment of the transceiver 100.

The aforementioned operation of generating the estimated signal-to-interference ratio SIR conducted by the interference detection circuit 116 is performed in a period during which the calibration circuit 114 generates the one or more compensation parameters IQK.

The receiver control circuit 117 is coupled with the calibration circuit 114, the parameter storage circuit 115 and the interference detection circuit 116. The receiver control circuit 117 is arranged to operably determine whether to discard the compensation parameters IQK currently generated by the calibration circuit 114 according to the estimated signal-to-interference ratio SIR currently generated by the interference detection circuit 116. In operation, the receiver control circuit 117 may compare the estimated signal-to-interference ratio SIR generated by the interference detection circuit 116 with a predetermined threshold to determine the interference level of the current environment of the transceiver 100.

In this embodiment, the receiver control circuit 117 would store one or more compensation parameters IQK currently generated by the calibration circuit 114 into the parameter storage circuit 115 only if the estimated signal-to-interference ratio SIR exceeds a predetermined threshold. In the subsequent normal operations, the calibration circuit 114 and/or related amplifiers of the analog signal processing circuit 111 may operate according to one or more compensation parameters IQK stored in the parameter storage circuit 115, so as to reduce or eliminate the I/Q mismatch phenomenon in the receiver circuit 110.

On the contrary, if the estimated signal-to-interference ratio SIR is below the predetermined threshold, the receiver control circuit 117 would discard the compensation parameters IQK currently generated by the calibration circuit 114, and does not store them into the parameter storage circuit 115. This is because there would be many biases existing in the compensation parameters generated by the calibration circuit 114 if the calibration circuit 114 is affected by the interference in the current environment. It would degrade the operating performance of the receiver circuit 110 if the compensation parameters having bias are employed by the calibration circuit 114 and/or related amplifiers in the analog signal processing circuit 111 in the subsequent normal operation.

In practice, each of the aforementioned analog signal processing circuit 111, the in-phase signal processing circuit 112, the quadrature signal processing circuit 113, and the transmitter circuit 120 may be realized with various suitable existing circuits. The parameter storage circuit 115 may be realized with various suitable non-volatile storage devices. Each of the calibration circuit 114 and the interference detection circuit 116 may be realized with various suitable circuits having digital computing ability. The receiver control circuit 117 may be realized with various suitable digital processing circuits.

In addition, different functional blocks of the aforementioned transceiver 100 may be realized with separate circuits, or may be integrated into a single circuit chip. For example, different functional blocks of the receiver circuit 110 may be integrated into a single circuit chip, while the transmitter circuit 120 may be realized with another circuit chip. Alternatively, the receiver circuit 110 and the transmitter circuit 120 may be integrated into a single circuit chip.

Figure 2:
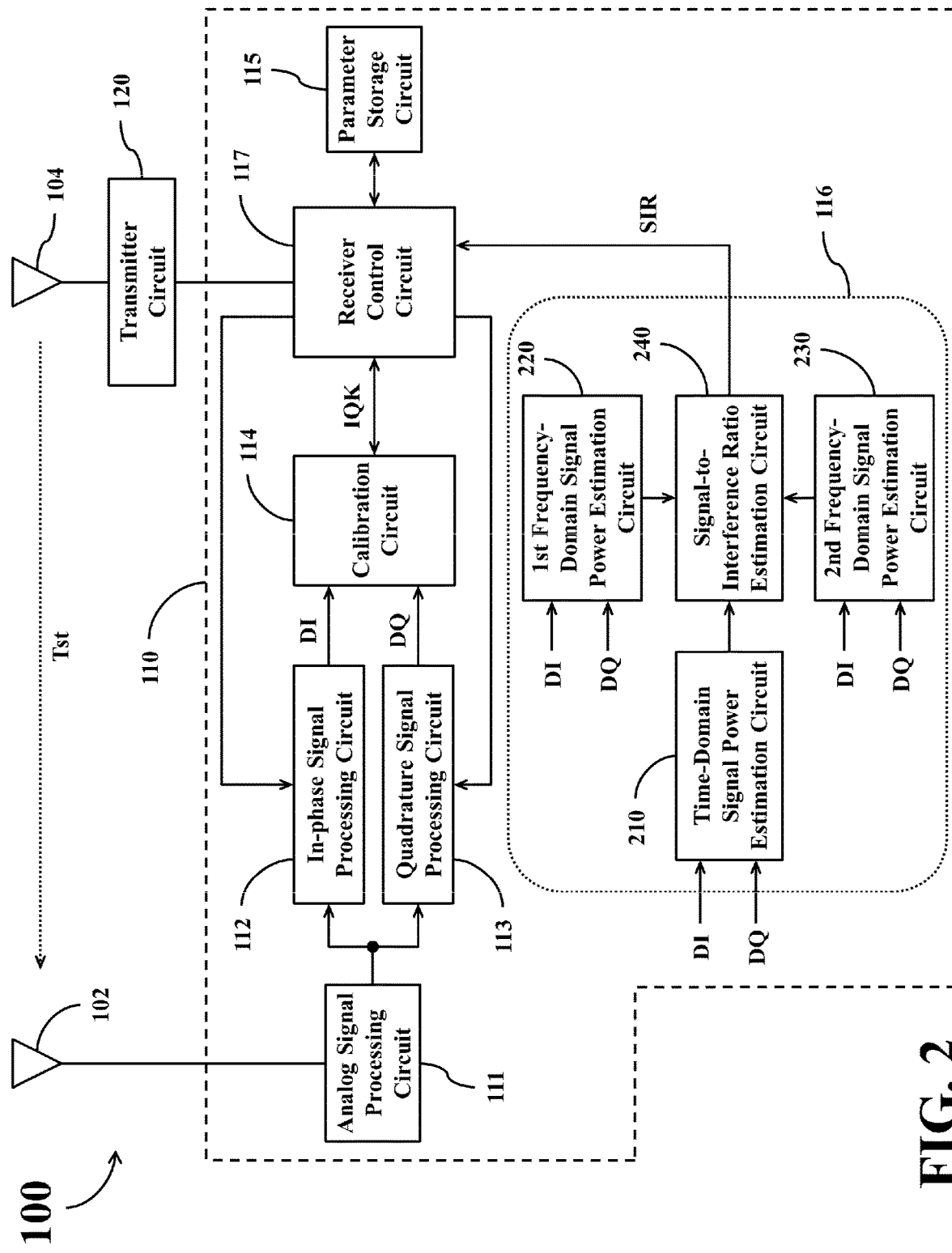
FIG. 2 shows a simplified functional block diagram of an interference detection circuit in FIG. 1 according to one embodiment of the present disclosure.

Please refer to FIG. 2, which shows a simplified functional block diagram of the interference detection circuit 116 in FIG. 1 according to one embodiment of the present disclosure.

In the embodiment of FIG. 2, the interference detection circuit 116 comprises a time-domain signal power estimation circuit 210, a first frequency-domain signal power estimation circuit 220, a second frequency-domain signal power estimation circuit 230, and a signal-to-interference ratio estimation circuit 240. The time-domain signal power estimation circuit 210, the first frequency-domain signal power estimation circuit 220, and the second frequency-domain signal power estimation circuit 230 are all coupled with the output terminal of the in-phase signal processing circuit 112 and the output terminal of the quadrature signal processing circuit 113. The signal-to-interference ratio estimation circuit 240 is coupled with the output terminal of the time-domain signal power estimation circuit 210, the output terminal of the first frequency-domain signal power estimation circuit 220, and the output terminal of the second frequency-domain signal power estimation circuit 230.

When the receiver circuit 110 needs to perform the aforementioned I/Q mismatch calibration procedure, the receiver control circuit 117 would instruct the transmitter circuit 120 to transmit a predetermined signal Tst having a given frequency through the transmitting antenna 104 at a specific time point, so that the receiving antenna 102 can receive signals transmitted from the transmitting antenna 104.

In this situation, the analog signal processing circuit 111 would process signals received by the receiving antenna 102 at the aforementioned specific time point, and transmit the processed signal to the in-phase signal processing circuit 112 and the quadrature signal processing circuit 113. The in-phase signal processing circuit 112 would generate the aforementioned in-phase detection signal DI according to signals outputted from the analog signal processing circuit 111 at the aforementioned specific time point. The quadrature signal processing circuit 113 would generate the aforementioned quadrature detection signal DQ according to the signals outputted from the analog signal processing circuit 111 at the aforementioned specific time point.

In the interference detection circuit 116, the time-domain signal power estimation circuit 210 is arranged to operably generate a time-domain estimated signal power corresponding to a target frequency according to the aforementioned in-phase detection signal DI and the quadrature detection signal DQ. In the present embodiment, the aforementioned target frequency is the frequency of the predetermined signal Tst.

The first frequency-domain signal power estimation circuit 220 is arranged to operably generate a frequency-domain estimated target signal power corresponding to the target frequency according to the aforementioned in-phase detection signal DI and the quadrature detection signal DQ.

The second frequency-domain signal power estimation circuit 230 is arranged to operably generate a frequency-domain estimated signal power corresponding to a specific frequency according to the aforementioned in-phase detection signal DI and the quadrature detection signal DQ.

In the present embodiment, the signal-to-interference ratio estimation circuit 240 is arranged to operably generate an estimated signal-to-interference ratio SIR corresponding to a wide band interference level in the current environment of the transceiver 100 according to estimated values generated by the time-domain signal power estimation circuit 210, the first frequency-domain signal power estimation circuit 220, and the second frequency-domain signal power estimation circuit 230. Additionally, the signal-to-interference ratio estimation circuit 240 is also arranged to operably generate an estimated signal-to-interference ratio SIR corresponding to a narrow band interference level in the current environment of the transceiver 100 according to estimated values generated by the first frequency-domain signal power estimation circuit 220 and the second frequency-domain signal power estimation circuit 230.

If the receiver control circuit 117 wants to measure the wide band interference level in the current environment of the transceiver 100, the second frequency-domain signal power estimation circuit 230 may generate a frequency-domain estimated mirror frequency signal power corresponding to a mirror frequency of the aforementioned target frequency according to the in-phase detection signal DI and the quadrature detection signal DQ under the instruction of the receiver control circuit 117.

In this situation, the signal-to-interference ratio estimation circuit 240 may generate an estimated signal-to-interference ratio SIR corresponding to the wide band interference level in the current environment of the transceiver 100 according to the aforementioned time-domain estimated signal power, the frequency-domain estimated target signal power, and the frequency-domain estimated mirror frequency signal power.

In operations, the signal-to-interference ratio estimation circuit 240 may calculate a frequency-domain estimated wide band interference according to the time-domain estimated signal power, the frequency-domain estimated target signal power, and the frequency-domain estimated mirror frequency signal power. For example, the signal-to-interference ratio estimation circuit 240 may generate the frequency-domain estimated wide band interference according to the following formula (1):

Frequency-domain estimated wide band interference=$N$*Time-domain estimated signal power−Frequency-domain estimated target signal power−Frequency-domain estimated mirror frequency signal power (1)

wherein N denotes the sampling times of the in-phase detection signal DI and the quadrature detection signal DQ.

Then, the signal-to-interference ratio estimation circuit 240 divides the frequency-domain estimated target signal power by the frequency-domain estimated wide band interference so as to generate an estimated signal-to-interference ratio SIR that reflects the wide band interference level in the current environment of the transceiver 100.

The receiver control circuit 117 may compare the estimated signal-to-interference ratio SIR with a first predetermined threshold to determine the wide band interference level in the current environment of the transceiver 100. In the present embodiment, if the estimated signal-to-interference ratio SIR exceeds or is equal to the first predetermined threshold, it means that the current wide band interference level is within an acceptable range. On the contrary, if the estimated signal-to-interference ratio SIR is below the first predetermined threshold, then it means that the current wide band interference level is too high, and would cause the compensation parameters currently generated by the calibration circuit 114 to be unreliable.

Therefore, the receiver control circuit 117 may store one or more compensation parameters IQK currently generated by the calibration circuit 114 into the parameter storage circuit 115 only if the estimated signal-to-interference ratio SIR exceeds the first predetermined threshold, so that the calibration circuit 114 and/or related amplifiers of the analog signal processing circuit 111 can use them in the subsequent normal operation.

On the other hand, if the receiver control circuit 117 wants to measure the narrow band interference level at a specific frequency point in the current environment of the transceiver 100, the receiver control circuit 117 may transmit the specific frequency point in concern to the second frequency-domain signal power estimation circuit 230 in appropriate format of parameters or data, so that the second frequency-domain signal power estimation circuit 230 generates a frequency-domain estimated narrow band interference corresponding to a narrow band interference according to the in-phase detection signal DI and the quadrature detection signal DQ, wherein the aforementioned narrow band interference corresponds to the specific frequency point concerned by the receiver control circuit 117.

In this situation, the signal-to-interference ratio estimation circuit 240 may divide the frequency-domain estimated target signal power by the frequency-domain estimated narrow band interference, so as to generate an estimated signal-to-interference ratio SIR that reflects the narrow band interference level in the specific frequency point of the current environment of the transceiver 100.

The receiver control circuit 117 may compare the estimated signal-to-interference ratio SIR with a second predetermined threshold to determine the narrow band interference level at the specific frequency point in the current environment of the transceiver 100. In the present embodiment, if the estimated signal-to-interference ratio SIR exceeds or is equal to the second predetermined threshold, it means that the current narrow band interference level at the specific frequency point is within an acceptable range. On the contrary, if the estimated signal-to-interference ratio SIR is below the second predetermined threshold, then it means that the current narrow band interference level at the specific frequency point is too high, and would cause the compensation parameters currently generated by the calibration circuit 114 to be unreliable.

Therefore, the receiver control circuit 117 may store one or more compensation parameters IQK currently generated by the calibration circuit 114 into the parameter storage circuit 115 only if the estimated signal-to-interference ratio SIR exceeds the second predetermined threshold, so that the calibration circuit 114 and/or related amplifiers of the analog signal processing circuit 111 can use them in the subsequent normal operation.

As can be appreciated from the foregoing descriptions, it can effectively prevent the calibration circuit 114 and/or related amplifiers of the analog signal processing circuit 111 from employing erroneous compensation parameters IQK in the subsequent normal operation by discarding the compensation parameters IQK currently generated by the calibration circuit 114 in the situation where the estimated signal-to-interference ratio SIR generated by the interference detection circuit 116 is below the related threshold. This approach can reduce the I/Q mismatch phenomenon in the receiver circuit 110 more effectively.

As a result, the signal-to-noise ratio of the receiver circuit 110 can be significantly improved, thereby increasing the overall throughput of the transceiver 100.

Please note that the foregoing circuit structure shown in FIG. 2 is merely an exemplary embodiment, rather than a restriction to the practical implementations.

Figure 3:
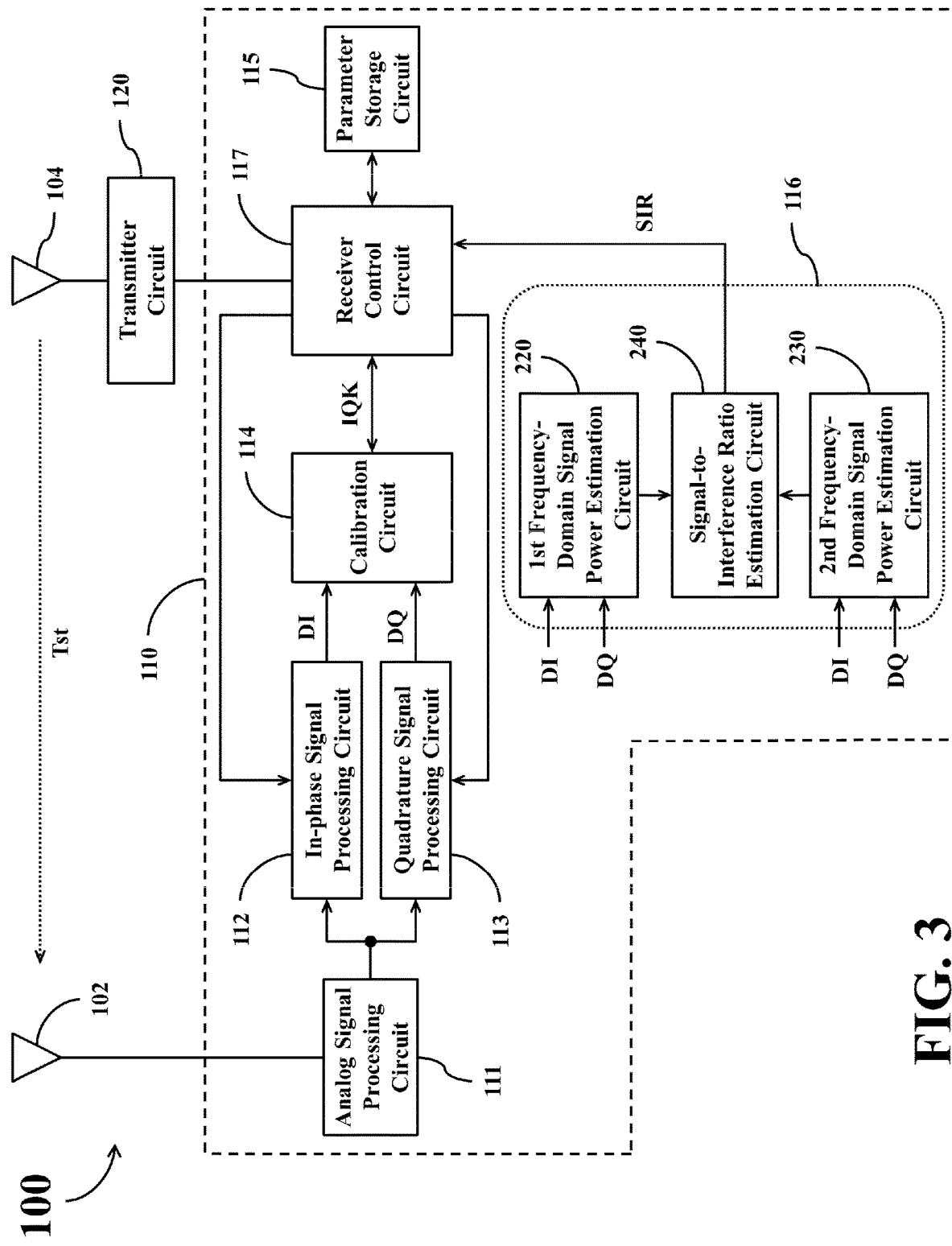
FIG. 3 shows a simplified functional block diagram of the interference detection circuit in FIG. 1 according to another embodiment of the present disclosure.

For example, in applications where the receiver control circuit 117 determines whether to discard the compensation parameters IQK currently generated by the calibration circuit 114 according to only the narrow band interference level at the specific frequency point in the current environment of the transceiver 100, the aforementioned time-domain signal power estimation circuit 210 in FIG. 2 may be omitted to form the architecture shown in FIG. 3.

The foregoing descriptions regarding the connections, implementations, operations, and related advantages of other components in FIG. 2 are also applicable to those in FIG. 3. For the sake of brevity, those descriptions will not be repeated here.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A receiver circuit (110) of a transceiver (100), comprising:
   a calibration circuit (114), arranged to operably perform an I/Q mismatch calibration operation according to an in-phase detection signal (DI) and a quadrature detection signal (DQ) to generate one or more compensation parameters (IQK);
   a parameter storage circuit (115);
   an interference detection circuit (116), arranged to operably generate an estimated signal-to-interference ratio (SIR) according to the in-phase detection signal (DI) and the quadrature detection signal (DQ); and
   a receiver control circuit (117), coupled with the calibration circuit (114), the parameter storage circuit (115), and the interference detection circuit (116), and arranged to operably determine whether to discard the one or more compensation parameters (IQK) according to the estimated signal-to-interference ratio (SIR);
   wherein the receiver control circuit (117) stores the one or more compensation parameters (IQK) into the parameter storage circuit (115) only if the estimated signal-to-interference ratio (SIR) exceeds a predetermined threshold.

2. The receiver circuit (110) of claim 1, further comprising:
   an analog signal processing circuit (111), arranged to operably process signals received by a receiving antenna (102) of the transceiver (100);
   an in-phase signal processing circuit (112), arranged to operably generate the in-phase detection signal (DI) according to signals outputted from the analog signal processing circuit (111); and
   a quadrature signal processing circuit (113), arranged to operably generate the quadrature detection signal (DQ) according to signals outputted from the analog signal processing circuit (111).

3. The receiver circuit (110) of claim 2, wherein the interference detection circuit (116) generates the estimated signal-to-interference ratio (SIR) in a period during which the calibration circuit (114) generates the one or more compensation parameters (IQK).

4. The receiver circuit (110) of claim 2, wherein the receiver control circuit (117) instructs a transmitter circuit (120) of the transceiver (100) to transmit a predetermined signal (Tst) through a transmitting antenna (104) at a specific time point, and the in-phase signal processing circuit (112) generates the in-phase detection signal (DI) according to signals outputted at the specific time point from the analog signal processing circuit (111), and the quadrature signal processing circuit (113) generates the quadrature detection signal (DQ) according to the signals outputted at the specific time point from the analog signal processing circuit (111).

5. The receiver circuit (110) of claim 2, wherein the interference detection circuit (116) comprises:
   a time-domain signal power estimation circuit (210), arranged to operably generate a time-domain estimated signal power corresponding to a target frequency according to the in-phase detection signal (DI) and the quadrature detection signal (DQ);
   a first frequency-domain signal power estimation circuit (220), arranged to operably generate a frequency-domain estimated target signal power corresponding to the target frequency according to the in-phase detection signal (DI) and the quadrature detection signal (DQ);
   a second frequency-domain signal power estimation circuit (230), arranged to operably generate a frequency-domain estimated mirror frequency signal power corresponding to a mirror frequency of the target frequency according to the in-phase detection signal (DI) and the quadrature detection signal (DQ); and
   a signal-to-interference ratio estimation circuit (240), coupled with the time-domain signal power estimation circuit (210), the first frequency-domain signal power estimation circuit (220), and the second frequency-domain signal power estimation circuit (230), and arranged to operably generate the estimated signal-to-interference ratio (SIR) according to the time-domain estimated signal power, the frequency-domain estimated target signal power, and the frequency-domain estimated mirror frequency signal power.

6. The receiver circuit (110) of claim 5, wherein the signal-to-interference ratio estimation circuit (240) calculates a frequency-domain estimated wide band interference according to the time-domain estimated signal power, the frequency-domain estimated target signal power, and the frequency-domain estimated mirror frequency signal power, and then divides the frequency-domain estimated target signal power by the frequency-domain estimated wide band interference to generate the estimated signal-to-interference ratio (SIR).

7. The receiver circuit (110) of claim 2, wherein the interference detection circuit (116) comprises:
   a first frequency-domain signal power estimation circuit (220), arranged to operably generate a frequency-domain estimated target signal power corresponding to a target frequency according to the in-phase detection signal (DI) and the quadrature detection signal (DQ);
   a second frequency-domain signal power estimation circuit (230), arranged to operably generate a frequency-domain estimated narrow band interference corresponding to a narrow band interference frequency according to the in-phase detection signal (DI) and the quadrature detection signal (DQ); and a signal-to-interference ratio estimation circuit (240), coupled with the first frequency-domain signal power estimation circuit (220) and the second frequency-domain signal power estimation circuit (230), and arranged to operably generate the estimated signal-to-interference ratio (SIR) according to the frequency-domain estimated target signal power and the frequency-domain estimated narrow band interference.

8. The receiver circuit (110) of claim 7, wherein the signal-to-interference ratio estimation circuit (240) divides the frequency-domain estimated target signal power by the frequency-domain estimated narrow band interference to generate the estimated signal-to-interference ratio (SIR).

\* \* \* \* \*